US006880590B2

(12) United States Patent
Cornfield (10) Patent No.: US 6,880,590 B2
(45) Date of Patent: Apr. 19, 2005

(54) ERGONOMIC LADLE (76) Inventor: Randall Cornfield, 5516 Ashdale, Montreal, Que (CA), H4W 3G4

(*) Notice: Subject to any disclaimer, the term of this patent is extended or adjusted under 35 U.S.C. 154(b) by 197 days.

(21) Appl. No.: 10/436,149

(22) Filed: May 13, 2003

(65) Prior Publication Data
US 2004/0250876 A1 Dec. 16, 2004

(51) Int. Cl.[7] .............................. B65B 1/04; B65B 3/04; B67C 3/02
(52) U.S. Cl. ....................... 141/110; 141/108; 210/466; 222/572
(58) Field of Search ................................ 141/110, 108; 30/324–326; 210/464–470; D7/690, 691; 222/572, 575

(56) References Cited

U.S. PATENT DOCUMENTS

| 1,057,269 A | * | 3/1913 | Prestien | 30/123 |
| 2,556,092 A | * | 6/1951 | Kimball | 401/12 |
| 4,839,965 A | * | 6/1989 | Levie | 30/324 |
| 6,551,046 B1 | * | 4/2003 | Dorrington | 414/408 |

* cited by examiner

Primary Examiner—Timothy L. Maust (57) ABSTRACT

A ladle including: a concave peripheral wall having a wall peripheral edge delimiting a containment volume. The ladle peripheral wall includes a pouring section for facilitating the pouring out of foodstuff from the containment volume. The pouring section has a symmetrically concave configuration. A collecting section is provided for facilitating the collection of foodstuff from a container into the containment volume. The collecting section defines a scraping sub-section wherein the wall peripheral edge has a substantially rectilinear configuration, the scraping subsection extending integrally from the pouring section. The collecting section also defines a cornering sub-section wherein the wall peripheral edge has a substantially convex configuration, the cornering sub-section extending integrally from the scraping sub-section. A handle extends from the ladle peripheral wall intermediate the pouring section and the cornering sub-section. The scraping subsection is usable for both scooping foodstuff located substantially adjacent the container base wall into the containment volume and scraping foodstuff from at least a portion of the container base wall.

57 Claims, 7 Drawing Sheets

ERGONOMIC LADLE

FIELD OF THE INVENTION

The present invention relates to the general field of culinary implements and is particularly concerned with a multifunctional and ergonomic ladle.

BACKGROUND OF THE INVENTION

The traditional culinary or kitchen ladle is used extensively in various settings for serving various liquid foods and liquid-solid food mixtures such as soup, sauces, stews, gravy, fruit punch or the like. The conventional culinary ladle typically includes a bowl-like receptacle having a substantially concave wall defining a peripheral rim or edge. The bowl-like receptacle is rigidly mounted at one end of a substantially long and slender shank having a hand-grip portion at its other end. The rim normally defines a spout at a location about the edge. The handle, in turn, is typically attached to the bowl-like receptacle along its outer circumference, approximately 90 degrees from the spout.

During use, a user typically grasps the handle of a conventional ladle and dips the ladle bowl into a food container. The liquid food or liquid-solid foods mixture flows into the bowl-like container of the ladle until it is filled to a desired level. The user via the handle then transfers the ladle to a second container such as a plate or serving dish.

To dispense the food from the ladle, the spout is typically positioned over the second receptacle such that, typically, the spout faces the user. The user begins by rotating his or her wrist to tip the the ladle until it is filled to a desired level. The user via the handle then transfers the ladle to a second container such as a plate or serving dish.

To dispense the food from the ladle, the spout is typically positioned over the second receptacle such that, typically, the spout faces the user. The user begins by rotating his or her wrist to tip the spout downward. Typically, the handle is swung in a rather long arc in order to tilt the receptacle in such a manner as to discharge the content of the ladle.

Although conventional ladles have been used extensively for a great number of years, they nevertheless suffer from numerous drawbacks. One of these drawbacks relates to the fact that although the bowl-like receptacle of the conventional ladle is relatively easy fill by dipping it into a relatively large container holding a relatively large or deep volume of food, these conventional ladles have proven to be unsuitable for scooping foodstuff located substantially adjacent the base wall or base-to-peripheral wall corner section of typical food containers.

Indeed, the substantially hemi-spherical configuration of most ladle bowls only allows a limited arc section of the bowl peripheral edge to contact or to be positioned adjacent the bowl receptacle base wall. Also, the generally rounded configuration of the conventional ladle bowl precludes the conventional ladles from being able to reach in the base-to-peripheral wall corner section of most conventional food containers. The typical radius of curvature of the base-to-peripheral wall corner section of most conventional food containers being typically smaller than the radius of the hemi-spherical bowl-like containers of conventional ladles, the conventional ladles are incapable of scooping foodstuff located adjacent the base-to-peripheral wall corner sections of conventional food containers and, a fortiori, of scraping the base-to-peripheral wall corner section of food containers.

The incapacity of conventional food ladles to be used satisfactorily adjacent the base wall and base-to-peripheral wall corner sections of conventional food containers potentially leads to considerable wastage of valuable foodstuff. It also forces users of such conventional ladles to purchase, use and maintain additional make-shift culinary implements such as smaller spoons used for scooping foodstuff adjacent corner sections of the conventional food containers, scraping implements for scraping both the bottom wall and corner sections of conventional food containers and the like.

Accordingly, there exists a need for an improved ladle facilitating scooping of foodstuff from a position located adjacent both the food container base wall and the container base-to-peripheral wall corner section. There also exists a need for an improve ladle allowing for scraping of a conventional food container base wall and scraping of a conventional food container base-to-peripheral corner section.

Another disadvantage associated with most conventional culinary ladles relates to the fact that the typical movement required for discharging the foodstuff from a bowl-like container of conventional ladles is typically ergonomically unacceptable. Indeed, the limited range of movement of the human wrist sometimes prevents the user from emptying the ladle bowl solely by using the wrist. Also, the distribution of the weight of the foodstuff within the ladle bowl is such that it sometimes requires a forearm strength exceeding that of some individuals.

As a consequence, instead of only using the wrist, once the range limit of the wrist is reached, the user must rotate and extend his or her arm and shoulder. Thus, the user is forced to awkwardly rotate his or her wrist, arm and shoulder to completely empty the contents of the ladle bowl. This not only potentially leads to spillage incidents but may also lead, in the long run, to repetitive-type stress injuries for individuals using conventional ladles more extensively such as cooks, chefs and the like.

The unnatural and ergonomically unsound motion is further complicated when the ladle is used in a partially shielded environment. For example, at many restaurant salad bars, a plastic shield or "sneeze guard" constricts the area available for manipulating the ladle when pouring salad dressings, soups and the like. The plastic shield basically prevents the user from performing the exaggerated arm and shoulder motion required by the standard ladle design. The standard ladle design hence typically greatly impedes simpler pouring motions. Accordingly, there exists a need for a ladle designed for more ergonomic and convenient pouring.

Still, another disadvantage associated with most conventional prior art ladles relates to their apparent lack of versatility. For example, most conventional ladles are incapable of serving the liquid only or the solids only from the liquid-solid mixtures. Solids can be removed from a liquid-solid mixture by using an additional implement such as a perforated strainer or spoon. The strainer is, however, incapable of serving the liquid-only from the liquid-solid mixture. For example, with respect to fruit punches, most people would prefer not to have solids in their drinks. In other situations, for example, it may be necessary to serve only broth from soup or only solids such as eggs from an egg bath.

Separating devices have been proposed in the prior art but they suffer from major drawbacks including unergonomical features and considerable complexity. Accordingly, there exists a need for an improved sieving ladle allowing for liquid-solid separation of liquid-solid food mixtures.

Yet, still another drawback associated with most conventional ladles relates to the difficulty in obtaining a relatively constant pouring flow in typical settings wherein the volume of food stuff within the ladle bowl varies. For example, in situations wherein the ladle is used to pour sauce over various dish plates, it may prove desirable to obtain a substantially constant pouring flow while pouring the sauce over different plates so as to obtain a generally similar or uniform plate presentation.

However, as the sauce is poured from one plate to another, the quantity of sauce remaining in the ladle bowl diminishes hence requiring a compensating or counter-balancing adjustment of the pouring motion. For example, as the volume of foodstuff within the ladle bowl diminishes, the pouring tilt of the ladle may need to be more pronounced. This compensating adjustment of the pouring stroke may prove to be tedious and may also lead to even more ergonomically questionable movements.

Accordingly, there exists a need for an improved ladle allowing for relative control over the pouring flow pattern so as to enable a generally uniform pouring flow pattern regardless of the quantity of foodstuff within the ladle bowl. Also, there exists a need for an improved ladle allowing for control of the pouring flow so as to enable a single ladle to be used for simulating the pouring flow pattern of ladles having various sizes and configurations.

Yet, still another disadvantage associated with those conventional culinary ladles relates to the inability of such conventional ladles to provide an assessment or evaluation of the quantity of foodstuff within the ladle bowl. This may lead to the need for additional implements such as measuring cups and, accordingly, to additional cooking steps such as pouring the food stuff into a measuring cup and then pouring back a measured volume into the cooking ladle. This, in turn, may prove to be both tedious and time-consuming.

Accordingly, there exists a need for an improved ladle having foodstuff volume measuring capacities.

A further disadvantage associated with conventional culinary ladles attempting to improve on the ergonomicity thereof or to increase their versatility, is that they are typically structurally complex and, hence, both more susceptible to failure and relatively expensive to manufacture. Accordingly, there exists a general need for an improved culinary ladle.

SUMMARY OF THE INVENTION

It is a general object of the present invention to provide an improved culinary ladle.

Advantages of the present invention include that, in at least one embodiment of the invention, the proposed culinary ladle allows for scooping of foodstuff located substantially adjacent the base wall and/or the base-to-peripheral wall corner section of conventional food containers or vessels. Also, in at least one embodiment of the invention, the proposed culinary ladle allows for scraping of the base wall and/or of the base-to-peripheral wall corner sections of conventional food containers.

Furthermore, in at least one embodiment of the invention, the proposed culinary ladle is designed so as to facilitate ergonomic handling thereof during both filling of the ladle bowl and pouring of foodstuff from the ladle bowl. In at least one embodiment of the invention, the handle of the proposed culinary ladle is positioned so as to take advantage of the torque created by the weight of the foodstuff within the ladle bowl to reduce the force required for tilting or pivoting the ladle during a typical pouring step.

Still furthermore, in at least one embodiment of the invention, the proposed culinary ladle is adapted to facilitate the separation of solids from the liquids of a solid-liquid food mixture through a set of quick and ergonomic steps. Also, in at least one embodiment of the invention, the proposed culinary ladle is adapted to improve control over the pouring flow pattern so as to enable an intended user to pour substantially uniformly and so as to allow a single ladle to simulate the flow pattern of other ladles having different configurations and sizes.

Yet still furthermore, in at least one embodiment of the invention, the proposed culinary ladle allows for straining and/or control over the pouring flow through the use of adaptors releasably attachable to a pouring section of the ladle. The adaptors are designed so as to be attachable to and detachable from the ladle through a set of quick and ergonomic steps without requiring special tooling or manual dexterity.

Also, in at least one embodiment of the invention, the proposed ladle is adapted to provide visual indication of the volume of foodstuff contained within the ladle bowl. Yet still furthermore, the proposed ladle is designed so as to be manufacturable using conventional forms of manufacturing and conventional materials such as conventional polymeric resins so as to provide a culinary ladle that will be economically feasible, long-lasting and relatively trouble-free in operation.

In accordance with an embodiment of the present invention, there is provided a ladle for allowing both the collection of a foodstuff from a container into the ladle and the pouring out of the foodstuff from the ladle, the container defining a container base wall and a container peripheral wall, the container base and peripheral walls merging into a container corner section, the ladle comprising: a substantially concave ladle peripheral wail, the ladle peripheral wall having a wall peripheral edge delimiting a containment volume, the ladle peripheral wall defining a wall inner surface and a wall outer surface, the ladle peripheral wall including a pouring section for facilitating the pouring out of the foodstuff from the containment volume, the pouring section having a substantially symmetrically concave configuration; a collecting section for facilitating the collection of the foodstuff from the container into the containment volume, the collecting section defining a scraping sub-section wherein the wall peripheral edge has a substantially rectilinear configuration, the scrapping subsection extending integrally from the pouring section; a cornering sub-section wherein the wall peripheral edge has a substantially convex configuration, the cornering sub-section extending integrally from the scraping sub-section; a handle extending from the ladle peripheral wall substantially intermediate the pouring section and the cornering sub-section; whereby the scrapping subsection is usable for both scooping the foodstuff located substantially adjacent the container base wall into the containment volume and scrapping the foodstuff from at least a portion of the container base wall and wherein the cornering sub-section is usable for both scooping the foodstuff located substantially adjacent the container corner section into the containment volume and scraping the foodstuff from at least a portion of the container corner section.

Conveniently, the ladle peripheral wall also includes a measuring section for facilitating the determination of the volume of the foodstuff contained in the containment volume, the measuring section extending substantially between the cornering sub-section and the pouring section.

Typically, the ladle further comprises a flow modifying means attachable over at least a portion of the pouring section for modifying the flow of the foodstuff as the foodstuff is poured out of the ladle. Conveniently, the flow modifying means is releasably attachable over at least a portion of the pouring section.

Conveniently, the flow modifying means includes a flow modifying adaptor or plate, the flow modifying plate being attachable to the ladle so as to contact at least a portion of the wall peripheral edge.

In one embodiment of the invention, the flow modifying plate has at least one straining aperture extending therethrough for allowing the flow modifying means to act as a strainer.

In another embodiment of the invention, the flow modifying plate has a flow sizing aperture extending therethrough, the flow sizing aperture being positioned, configured and sized for limiting the flow of the foodstuff out of the ladle to a predetermined flow size.

Typically, the wall peripheral edge about the cornering sub-section includes a pair of cornering segments, the cornering segments converging towards a cornering apex. In one embodiment of the invention, the cornering apex defines a lip protruding substantially outwardly from the remainder of the wall peripheral edge.

Conveniently, the pouring section and the scrapping sub-section extend in a common reference geometrical plane. In at least one embodiment of the invention, the cornering sub-section having a lip portion thereof protruding from the reference geometrical plane, the lip portion protruding from the reference geometrical plane so as to form a lip-to-plane angle thesebetween.

In accordance with the present invention, there is also provided a ladle for allowing both the collection of a foodstuff from a container into the ladle and the pouring out of the foodstuff from the ladle, the container defining a container base wall and a container peripheral wall, the container base and peripheral walls merging into a container corner section, the ladle comprising: a substantially concave ladle peripheral wall, the ladle peripheral wall having a wall peripheral edge delimiting a containment volume, the ladle peripheral wall defining a wall inner surface and a wall outer surface, the ladle peripheral wall including a pouring section for facilitating the pouring out of the foodstuff from the containment volume, the pouring section having substantially the configuration of a quarter portion of a sphere; a collecting section for facilitating the collection of the foodstuff from the container into the containment volume, the collecting section defining a cornering sub-section wherein the wall peripheral edge has a substantially convex configuration so as to define a lip protruding substantially outwardly from the remainder of the ladle peripheral wall; a handle extending from the ladle peripheral wall substantially intermediate the pouring section and the cornering sub-section; whereby the cornering sub-section is usable for both scooping the foodstuff located substantially adjacent the container corner section into the containment volume and scrapping the foodstuff from at least a portion of the container corner section.

In accordance with the present invention, there is further provided a ladle for allowing both the collection of a foodstuff from a container into the ladle and the pouring out of the foodstuff from the ladle, the container defining a container base wall and a container peripheral wall, the container base and peripheral walls merging into a container corner section, the ladle comprising: a substantially concave ladle peripheral wall the ladle peripheral wall having a wall peripheral edge delimiting a containment volume, the ladle peripheral wall defining a wall inner surface and a wall outer surface, the ladle peripheral wall including a pouring section for facilitating the pouring out of the foodstuff from the containment volume, the pouring section having substantially the configuration of a quarter portion of a sphere; a collecting section extending from the pouring section for facilitating the collection of the foodstuff from the container into the containment volume; the pouring and collecting sections being delimited by a pouring-to-collecting delimiting plane extending therebetween; a handle extending from the ladle peripheral wall so as to be offset relative to the pouring-to-collecting delimiting plane on the same side of the latter as the collecting section; whereby the off-setting of the handle is adapted to facilitate the pouring of the foodstuff from the pouring section.

Conveniently, the handle is located substantially adjacent to the pouring-to-collecting delimiting plane. Typically, the handle is located substantially opposite to the collecting section. Conveniently, the handle defines a handle longitudinal axis and the handle is twisted substantially helicoidally and at least partially along the handle longitudinal axis.

BRIEF DESCRIPTION OF THE DRAWINGS

Various embodiments of the present invention will now be disclosed, by way of example, in reference to the following drawings in which.

DETAILED DESCRIPTION

Figure 7:
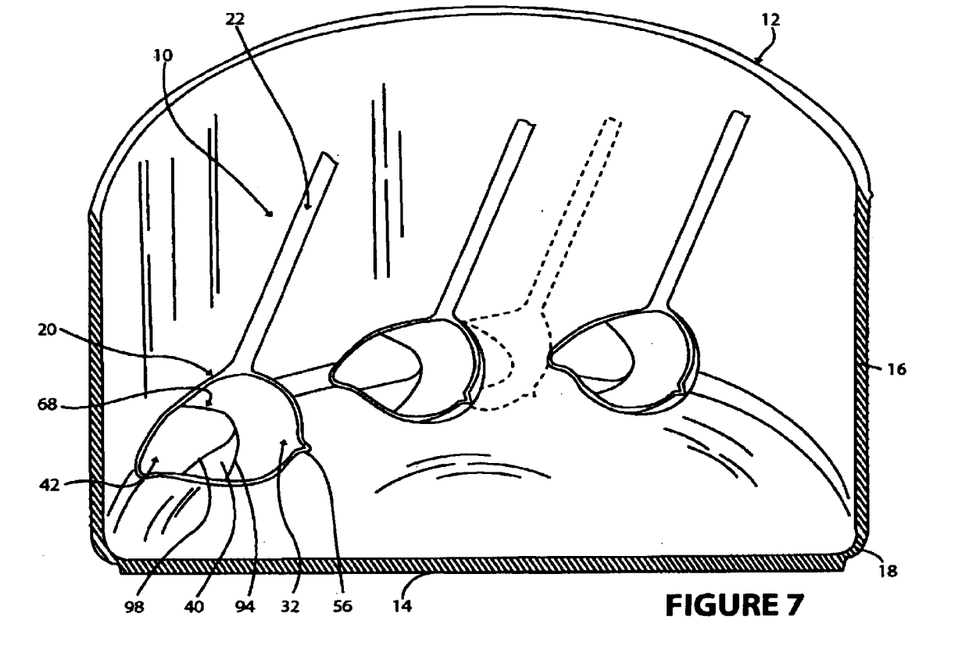
FIG. 7, in a partial perspective view with sections taken out, illustrates a ladle in accordance with an embodiment of the present invention, the ladle being shown scraping foodstuff adjacent a corner edge of a cooking vessel.

Referring to FIG. 7, there is shown an ergonomic and multifunctional ladle 10 in accordance with an embodiment of the present invention. The ladle 10 is shown inserted within a cooking container or vessel 12 defining a container base wall 14 and a container peripheral wall 16. The container base and peripheral walls 14, 16 are shown merging into a container corner section 18.

The ladle 10 is shown collecting or scooping foodstuff (not shown) substantially adjacent the container corner section 18. It should however be understood that although the ladle 10 is shown in some figures as being used in the specific context of culinary steps being performed with a specific type of cooking vessel, the ladle 10 could be used in other contexts and with other types of vessels without departing from the scope of the present invention.

Also, although the ladle 10 is shown in some figures as being used with a cooking vessel 12 having a substantially disc-shaped and flat base wall 14, a substantially cylindrical peripheral wall 16 and a generally rounded container corner section 18, it should be understood that the ladle 10 could be used with containers or vessels having different configurations without departing from the scope of the present invention.

Furthermore, although the ladle 10 is shown in some figures as being used with a liquid type of foodstuff 100, the ladle 10 could be used in other contexts and with other types of products or materials such as with granular material, a mixture of solid and liquid material, a mixture of solid, granular and liquid material or any other suitable flowable material without departing from the scope of the present invention.

The ladle 10 includes a substantially concave ladle peripheral wall indicated generally by the reference numeral 20. The ladle 10 is also shown throughout the figures as having a handle generally indicated by the reference numeral 22 extending from the ladle peripheral wall 20. It should, however, be understood that the ladle 10 could be provided without the handle 22 without departing from the scope of the present invention. In such instances, a separate handle-type component releasably attachable to the ladle peripheral wall 20 could be optionally separately provided.

Figure 1:
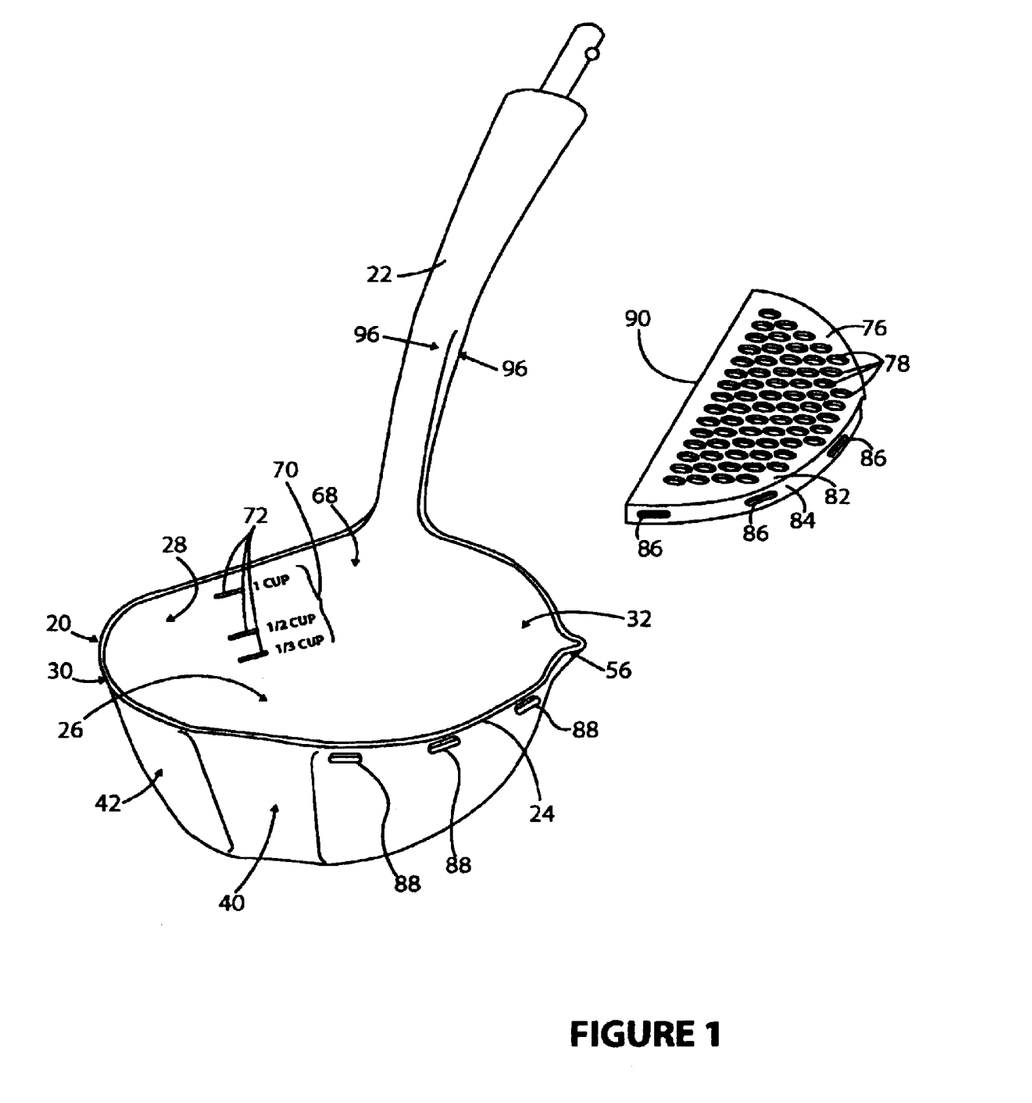
FIG. 1, in a perspective view with sections taken out illustrates a ladle in accordance with an embodiment of the present invention, the ladle being shown with a strainer adaptor about to be mounted thereon.
Figures 3, 4:
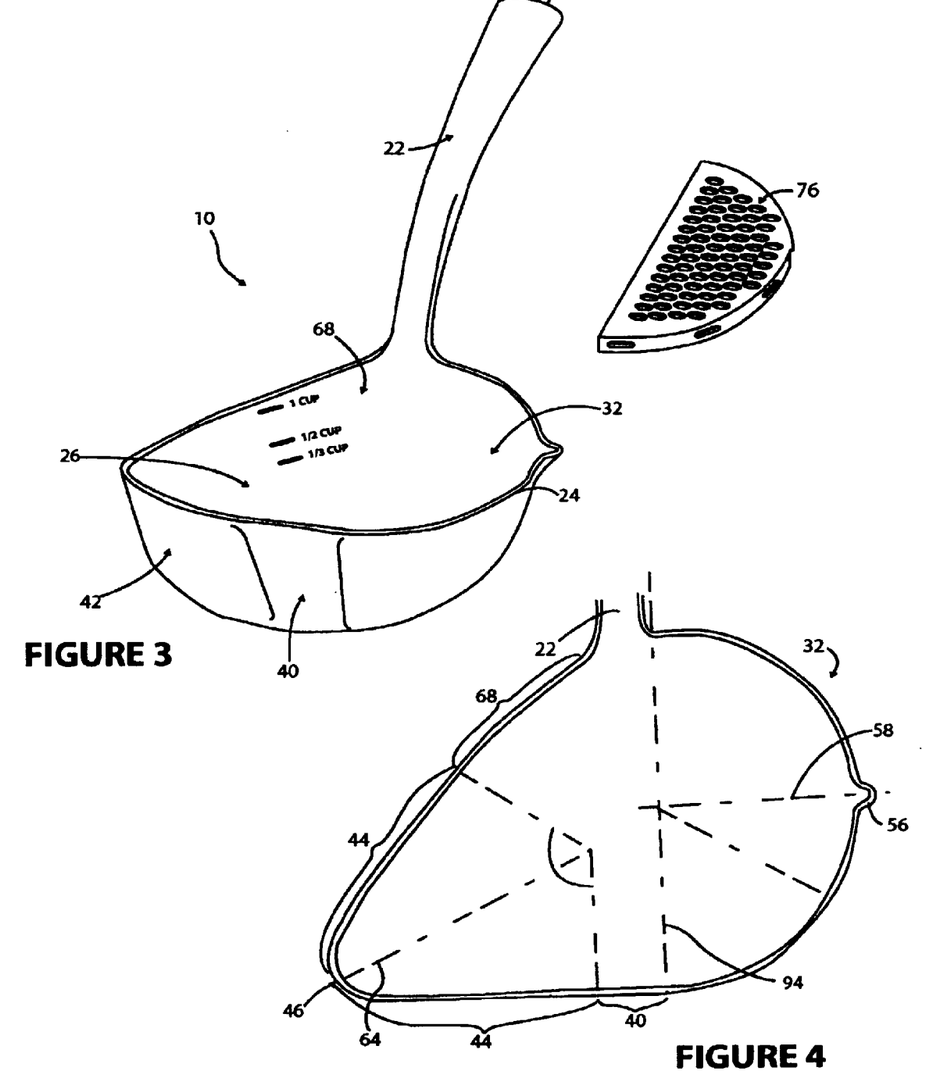
FIG. 3, in a perspective view with sections taken out illustrates a ladle in accordance with an alternative embodiment of the present invention, the ladle being shown with a strainer adaptor about to be mounted thereon.
FIG. 4, in a top view with sections taken out, illustrates part of ladle shown in FIG. 3.
Figures 5, 6:
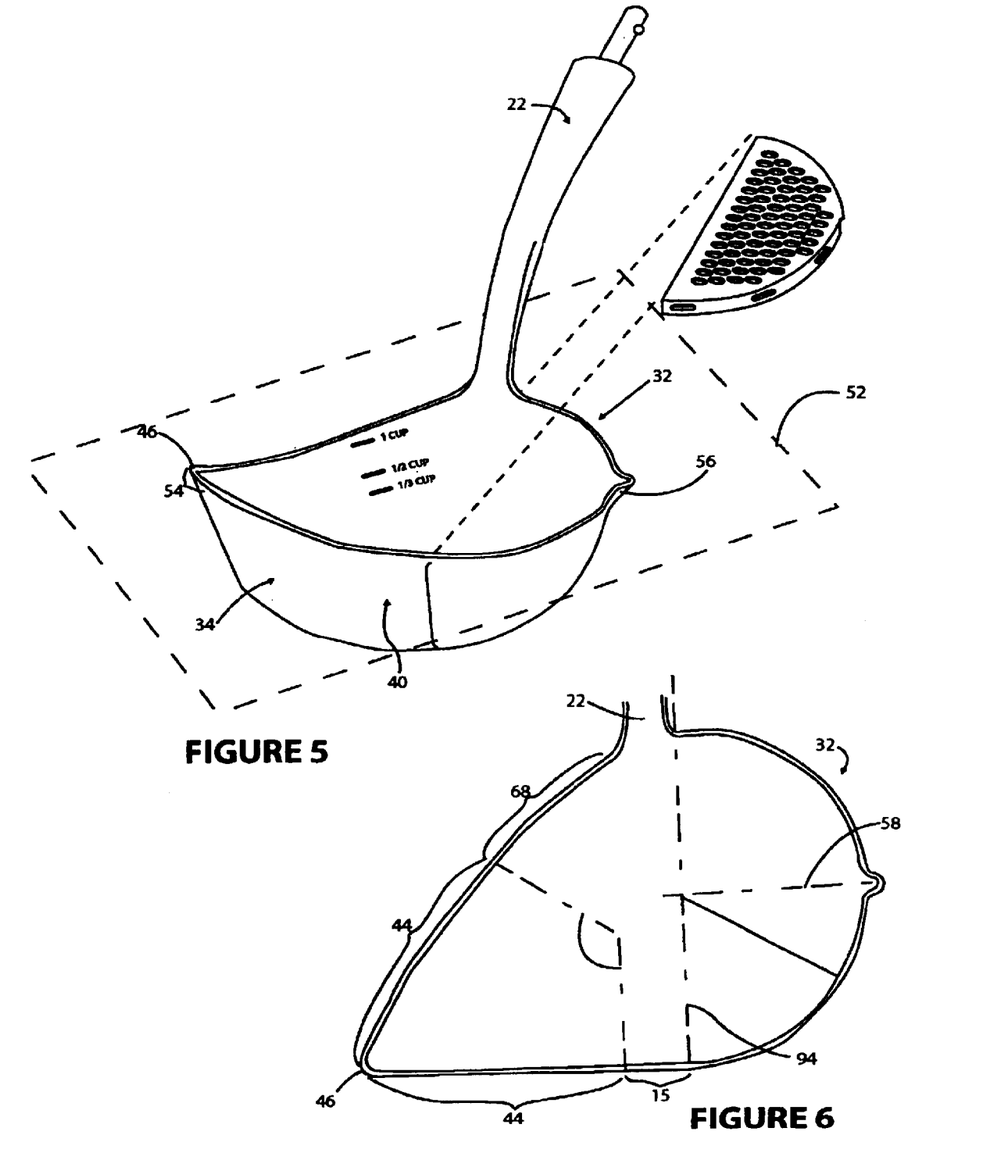
FIG. 5, in a perspective view with sections taken out illustrates a ladle in accordance with yet another alternative embodiment of the present invention, the ladle being shown with a strainer adaptor about to be mounted thereon.
FIG. 6, in a top view with sections taken out, illustrates part of the ladle shown in FIG. 5.

As shown more specifically in FIGS. 1, 3 and 5, the ladle peripheral wall 20 has a wall peripheral edge 24 delimiting a containment volume 26. The ladle peripheral wall 20 defines a wall inner surface 28 and opposed wall outer surface 30.

Figure 2:
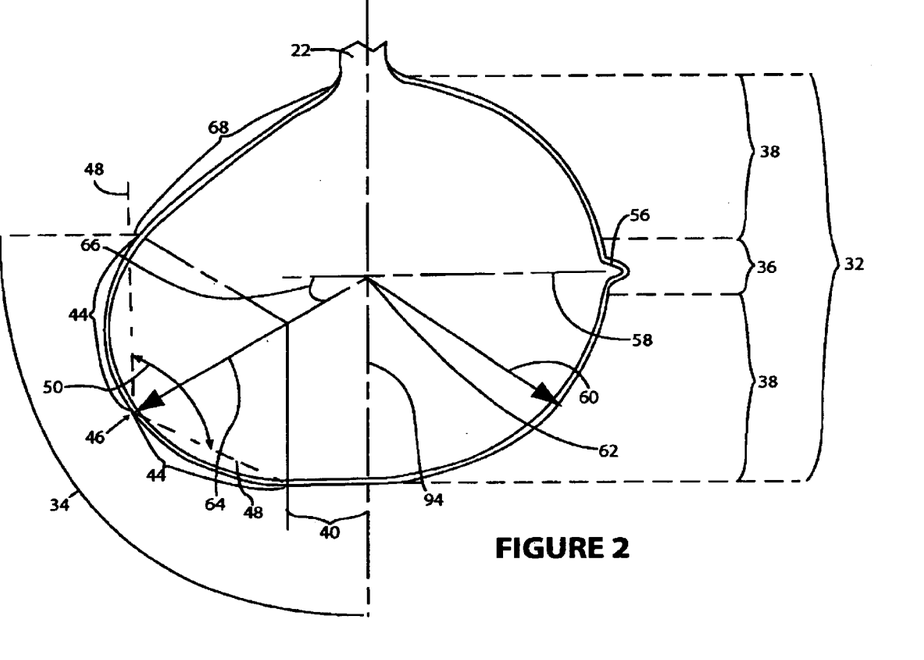
FIG. 2, in a top view with sections taken out, illustrates part of a ladle in accordance with an embodiment of the present invention.

As illustrated more specifically in FIGS. 2, 4 and 6, the ladle peripheral wall 20 includes a pouring section 32 for facilitating the pouring-out of the foodstuff 100 from the containment volume 26. The ladle peripheral wall 20 also includes a collecting section generally indicated by the reference numeral 34 for facilitating the collection of the foodstuff 100 from the container 12 into the containment volume 26.

The pouring section 32 typically has substantially the configuration of a quarter portion of a sphere. It should, however, be understood that the pouring section 32 could have other suitable configurations without departing from the scope of the present invention.

Typically, the wall peripheral edge 24 defines a food contacting portion 36 adapted to contact the foodstuff 100 as the latter is poured out of the ladle 10. Also, typically, the pouring section 32 defines a guiding portion 38 for guiding the foodstuff 100 towards the food contacting portion 36.

Preferably, the guiding portion 38 is symmetrically disposed relative to the food contacting portion 36 so that the foodstuff 100 will flow substantially uniformly towards the food contacting portion 36 when the ladle 10 is tilted substantially towards the latter.

In the embodiments shown throughout the figures, the guiding portion 38 includes the pouring section 32 in its entirety. In alternative embodiments of the invention (not shown) the guiding portion 38 may include only part of the pouring section 32 and may have other configurations such as generally flat converging wall sections or the like.

As illustrated more specifically in FIG. 2, the collecting section 34 defines a scraping sub-section 40 wherein the wall peripheral edge 24 has a substantially rectilinear configuration. The scraping sub-section 40 extends integrally from the pouring section 32.

The collecting section 34 also defines a cornering sub-section 42 wherein the wall peripheral edge 24 has a substantially convex configuration. The cornering sub-section 42 extends integrally from the scraping sub-section 40. It should be understood that both the scraping sub-section 40 and the cornering sub-section 42 could have other suitable configurations without departing from the scope of the present invention. For example, FIGS. 3, 4 and 5, 6 illustrate alternative configurations of the cornering sub-section 42.

Figure 8:
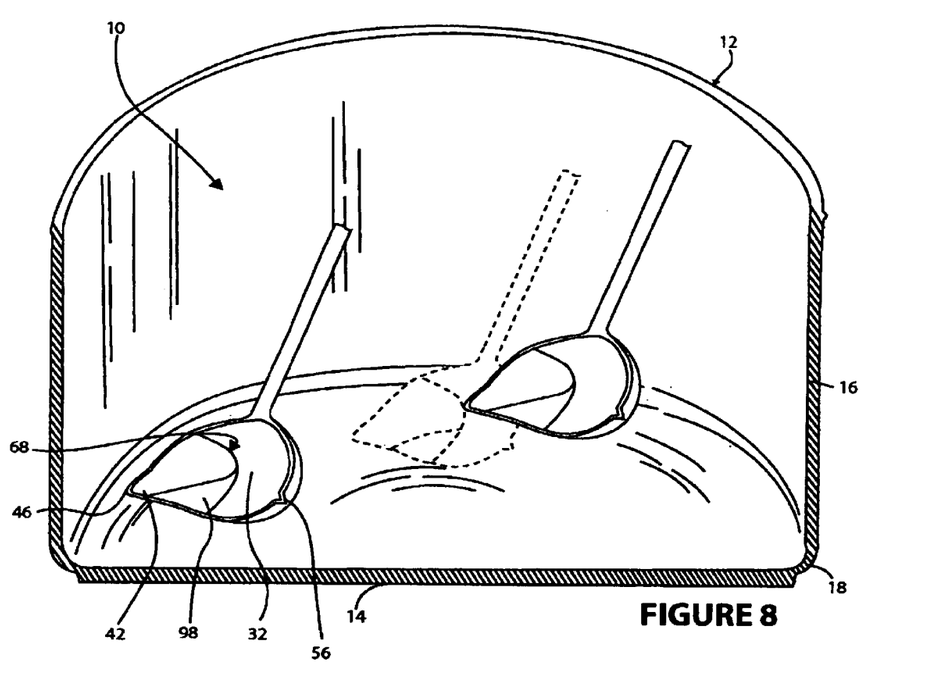
FIG. 8, in a partial perspective view with sections taken out, illustrates a ladle in accordance with an embodiment of the present invention, the ladle being shown scraping a bottom wall part of a cooking vessel.

As illustrated more specifically in FIG. 8, the scraping sub-section 40 is configured and sized for both scooping the foodstuff 100 located substantially adjacent the container base wall 14 and scraping the foodstuff 100 from at least a portion of the container base wall 14. As illustrated more specifically in FIG. 7, the cornering sub-section 42 is usable both for scooping the foodstuff 100 located substantially adjacent the container corner section 18 into the containment volume 26 and scraping the foodstuff 100 from at least a portion of the container corner section 18. configuration. In the embodiment shown in FIGS. 5 and 6, the cornering apex 46 has a substantially pointed configuration.

As illustrated more specifically in FIGS. 7 and 8, the scraping sub-sections and cornering subsections 40, 42 typically define a sub-section delimiting line 98 therebetween. Typically, the sub-section delimiting line 98 has generally the configuration of a sine wave. It should however be understood that the sub-section delimiting line could have other configurations without departing from the scope of the present invention.

Each cornering segment 44 extends substantially along a corresponding segment axis 48. In situations such as shown throughout the Figures wherein the cornering segments 44 are substantially arcuate, the segment axes 48 represent an average direction of the corresponding cornering segments 44. The segment axes 48 are angled relative to each other by a segment axis angle 50. The segment angle 50 is typically a substantially acute angle. Typically, although by no means exclusively, the segment axis angle 50 has a value of approximately between 30 and 160 degrees.

The wall peripheral edge 24 in the region of the scraping sub-section 40 and the pouring section 32 typically extends in a common reference geometrical plane illustrated in FIG. 5 and indicated generally by the reference numeral 52. The cornering apex 46 typically protrudes substantially outwardly from the remainder of the wall peripheral edge 24. In at least one embodiment of the invention shown in FIGS. 5 and 6, the ladle peripheral wall 20 adjacent the cornering apex 46 defines a lip section 54 protruding substantially outwardly from the edge geometrical plane 52.

The pouring section 32 defines a pouring spout 56 extending from the wall peripheral edge 24. Preferably, the spout 56 is positioned substantially centrally relative to the remainder of the pouring section 32.

As illustrated more specifically in FIG. 2, the spout 56 typically extends from the wall peripheral edge 24 substantially along a spout axis 58. In situations such as shown throughout the Figures wherein the pouring section 32 has substantially the configuration of a quarter of a sphere, the pouring section 32 typically defines a pouring section radius 60 having a radius origin 62. The ladle peripheral wall 20 about the pouring section 32 is preferably located substantially equidistally relative to the radius origin 62.

The pouring section radius 60 has a radius length. The scraping sub-section 48 has a scraping sub-section length. Typically, although by no means exclusively, the scraping sub-section length has a value substantially between one and three quarters that of the radius length.

Typically, although by no means exclusively, the wall peripheral edge 24 about the cornering sub-section 42 has substantially the configuration of an end portion of an ellipse or an arc segment of a circle defining respectively an ellipse long axis or an arc center radius 64. The ellipse long axis or arc center radius 64 is typically angled relative to the spout axis 58 by an ellipse-to-spout axis angle 66. Typically, although by no means exclusively, the ellipse-to-spout axis angle 66 has a value of approximately between 30 and 60 degrees. Typically, although by no means exclusively, the wall peripheral edge 24 about the scraping sub-section 40 merges substantially co-linearly with the wall peripheral edge 24 about the cornering sub-section 42.

As illustrated throughout the figures, the ladle peripheral wall 20 typically also includes a measuring section 68 for facilitating the determination of the volume of the foodstuff 100 contained in the containment volume 26. The measuring section 68 extends substantially between the cornering sub-section 42 and the pouring section 32. Typically, although by no means exclusively, the wall peripheral edge 24 about the measuring section 68 merges substantially co-linearly with the wall peripheral edge 24 about the cornering sub-section 42. Also, typically, although by no means exclusively, the spout axis 58 substantially delimits approximately the measuring section 68 from the cornering sub-section 42.

As illustrated more specifically in FIG. 1, the measuring section 68 is typically provided with at least one and preferably a plurality of measuring indications 70 marked thereon. Typically, the measuring indications 70 include measuring lines 72 protruding from the wall inner surface 28 into the containment volume 26. The measuring indications 70 also typically include corresponding values of measurement engraved or printed or otherwise marked adjacent corresponding measuring lines 68.

As illustrated more specifically in FIGS. 1, 3, 5, 9 and 10, the ladle 10 optionally further includes a flow modifying means attachable over at least a portion of the pouring section 32 for modifying the flow of the foodstuff 100 as the latter is poured out of the ladle 10. Preferably, the flow modifying means is releasably attachable over at least a portion of the pouring section 32.

Typically, the flow modifying means includes a flow-modifying adaptor 76 having a substantially plate-like configuration. It should be understood that the flow-modifying adaptor 76 could have other configurations without departing from the scope of the present invention. The flow-modifying adaptor 76 is attachable to the ladle 10 so as to contact at least a portion of the wall peripheral edge 24.

In at least one embodiment of the invention shown in FIGS. 1, 3, 5 and 9, the flow-modifying adaptor 76 has at least one and preferably a plurality of straining apertures 78 extending therethrough for allowing the flow-modifying means to act as a strainer. Although the straining apertures 78 shown in FIGS. 1, 3, 5 and 9 are shown as being generally disc-shaped apertures disposed in a substantially regular pattern, it should be understood that the straining apertures 78 could have other configurations and be otherwise disposed without departing from the scope of the present invention.

Figure 10:
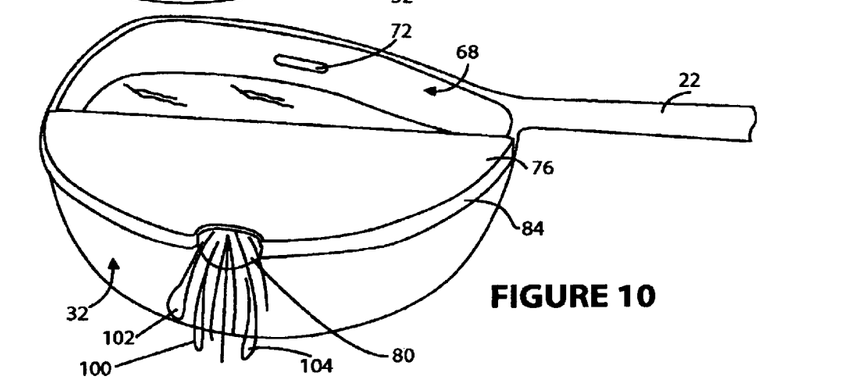
FIG. 10, in a partial perspective view with sections taken out, illustrates a ladle in accordance with an embodiment of the present invention, the ladle being shown with a flow modifying adaptor mounted thereon, the flow modifying adaptor being used for modifying the outflow of a liquid being poured out of the ladle.

As illustrated more specifically in FIG. 10, in at least one embodiment of the invention, the flow-modifying adaptor 76 has a flow-sizing aperture 80 extending therethrough. The flow-sizing aperture 80 is positioned, configured and sized for limiting the flow of the foodstuff 100 out of the ladle 10 to a predetermined flow stream size. Reference numeral 102 in FIG. 10 is used to designate the width of a flow stream 104 modified by the flow-sizing aperture 80 whereas the reference numeral 106 is used to designate the flow width of a similar but unmodified flow stream 108.

Control over the flow stream size being poured out of the ladle 10 facilitates uniform pouring of the foodstuff regardless of the amount of foodstuff 100 contained within the containment volume 26 and regardless of the pouring tilt used for pouring the foodstuff 100 out of the ladle 10. Control over the flow stream size also allows a single ladle 10 with flow-modifying adaptors 76 having different flow-sizing apertures to be used for pouring various types of foodstuffs such as soup, sauce or the like.

The flow-sizing aperture 80 is typically configured and sized so as to be substantially in register with the food-contacting portion 36 when the flow-modifying adaptor 76 is attached to the ladle 10. In embodiments wherein a pouring spout 56 is present, the flow-sizing aperture 80 is configured and sized so as to be substantially in register with the pouring spout 56 when the flow-modifying adaptor 76 is attached to the ladle 10.

Typically, the ladle 10 includes a tongue and groove combination formed between the flow modifying adaptor 76 and the ladle peripheral wall 20 for releasably attaching the flow-modifying adaptor 76 to the ladle 10. The flow-modifying adaptor 76 defines a plate peripheral edge. In the embodiments shown throughout the figures, the plate peripheral edge has a substantially arcuate plate edge first section 82. The plate edge first section 82 is configured and sized for being substantially in register with the wall peripheral edge 24 over at least a portion of preferably most or all of the pouring section 32.

The flow-modifying adaptor 76 typically further includes an attachment flange 84 depending integrally from at least a portion and preferably all of the plate edge first section 82. The attachment flange 84 has at least one and preferably a plurality of flange apertures 86 extending therethrough.

The pouring section 32 correspondingly has at least one and preferably a plurality of complementary tongues 88 protruding substantially outwardly from the wall outer surface 30. The flange apertures 86 and corresponding tongues 88 are positioned, configured and sized for cooperating in releasably attaching the flow-modifying adaptor 76 to the ladle peripheral wall 20.

In the embodiments shown throughout the figures, the flow-modifying 76 is configured and sized for extending substantially fully across the pouring section 32. In at least one alternative embodiment of the invention (not shown), the flow-modifying adaptor 76 only extends partially across the pouring section 32.

Typically, the plate peripheral edge also defines a substantially rectilinear plate edge second section 90 intercepting the plate edge first section 82.

Figure 9:
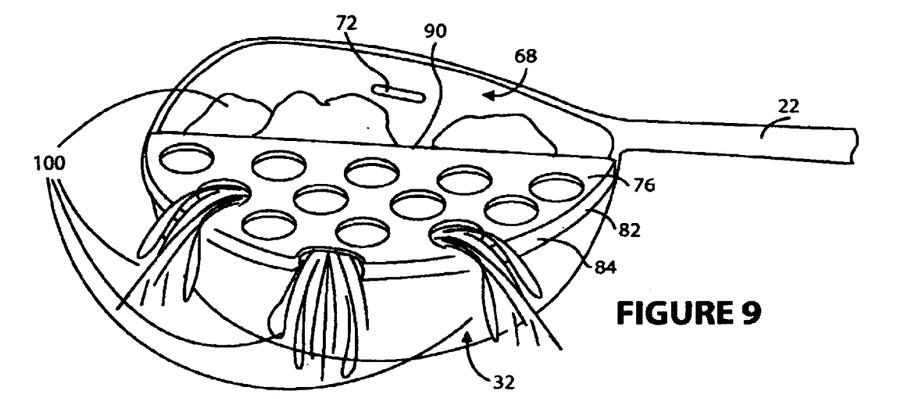
FIG. 9, in a partial perspective view with sections taken out, illustrates a ladle in accordance with an embodiment of the present invention, the ladle being shown with a strainer adaptor mounted thereon and pouring out a liquid therefrom.
Figure 11:
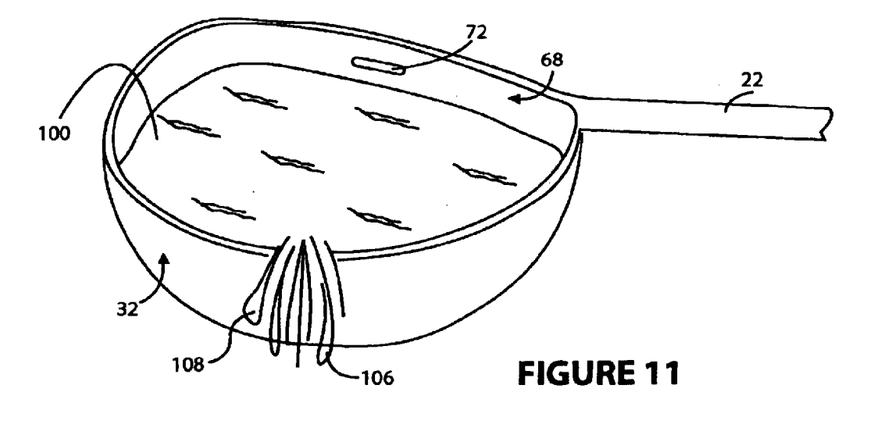
FIG. 11, in a partial perspective view with sections taken out, illustrates a ladle in accordance with an embodiment of the present invention, the ladle being shown pouring out a liquid therefrom.

As illustrated more specifically in FIGS. 9 through 11, both the measuring section 68 and the flow-modifying adaptor 76 are preferably configured and sized for allowing visualization of at least a portion and preferably most or all of the measuring section 68 when the flow modifying adaptor 76 is operatively mounted on the ladle peripheral wall 20 and the ladle 10 is ergonomically held by an intended user. In other words, in at least one embodiment of the invention, an intended user is able to use the measuring indications 70 for estimating the volume of foodstuff 100 within the containment volume 26 even when the flow-modifying adaptor 76 is attached to the ladle 10.

The handle 22 typically extends integrally from the ladle peripheral walls 20 substantially intermediate the pouring section 32 and the cornering sub-section 42. In situations such as shown throughout the figures wherein the ladle peripheral wall 20 further includes a measuring section 68, the handle 22 typically extends from the measuring section 68 substantially adjacent the pouring section 32.

The pouring and collecting sections 32, 34 are typically delimited from each other by a pouring-to-collecting delimiting plane 94 extending therebetween. The handle 22 typically extends from the ladle peripheral wall 20 so as to be offset relative to the pouring-to-collecting delimiting plane 94 on the same side of the latter as the collecting section 34. The offsetting of the handle 22 is adapted to facilitate the pouring of the foodstuff 100 from the pouring section 32. Indeed, the lever of the rotational torque created by the weight of the foodstuff 100 within the containment volume 26 is increased by the offset position of the handle 22 relative to a reference center line of the ladle peripheral wall. Hence, the requited torque for imparting a rotational movement of the handle about the handle longitudinal axis 90 is decreased.

As shown throughout the figures, the handle 22 is typically located substantially adjacent to the pouring-to-collecting delimiting plane 94. Also, the handle 22 is typically located substantially opposite to the scraping section 20. In situations wherein the ladle 10 includes a measuring section 68, the pouring-to-collecting delimiting plane 94 also delimits the pouring section 32 from the measuring section 68.

As illustrated more specifically in FIGS. 1, 3 and 5, the handle 22 is typically twisted substantially helicoidally and at least partially along a handle longitudinal axis 90. Typically, the handle 22 defines a pair of substantially opposed handle surfaces 96. The handle surfaces 96 are twisted substantially helicoidally and at least partially along the handle longitudinal axis 90.

Typically, although by no means exclusively, the handle 22 has a substantially ovaloïd cross-sectional configuration. The ovaloïd configuration tapers towards a substantially flat configuration in a direction leading towards the ladle peripheral 20. Typically, the handle 22 extends integrally from the wall peripheral edge 24 in a generally co-planar relationship relative therewith.

In the embodiments shown throughout the figures, the ladle 10 is designed for use more ergonomically by a right-handed user. It should be understood that the various sections of the ladle 10 could be positioned according to a mirror image of that shown throughout the figures for providing a left-handed user version of the ladle 10 without departing from the scope of the present invention.

Numerous other variations or modifications may be made to the hereinabove disclosed ladle without departing from the scope of the present invention.

I claim:

1. A ladle for allowing both the collection of a foodstuff from a container into said ladle and the pouring out of said foodstuff from said ladle, said container defining a container base wall and a container peripheral wall, said container base and peripheral walls merging into a container corner section, said ladle comprising:

a substantially concave ladle peripheral wall, said ladle peripheral wall having a wall peripheral edge delimiting a containment volume, said ladle peripheral wall defining a wall inner surface and a wall outer surface, said ladle peripheral wall including
a pouring section for facilitating the pouring out of said foodstuff from said containment volume, said pouring section having a substantially symmetrically concave configuration;
a collecting section for facilitating the collection of said foodstuff from said container into said containment volume, said collecting section defining
a scrapping sub-section wherein said wall peripheral edge has a substantially rectilinear configuration, said scrapping subsection extending integrally from said pouring section;
a cornering sub-section wherein said wall peripheral edge has a substantially convex configuration, said cornering sub-section extending integrally from said scrapping sub-section;
a handle extending from said ladle peripheral wall substantially intermediate said pouring section and said cornering sub-section;

whereby said scrapping subsection is usable for both scooping the foodstuff located substantially adjacent said container base wall into said containment volume and scrapping said foodstuff from at least a portion of said container base wall and wherein said cornering sub-section is usable for both scooping the foodstuff located substantially adjacent said container corner section into said containment volume and scrapping said foodstuff from at least a portion of said container corner section.

2. A ladle as recited in claim 1 wherein said ladle peripheral wall also includes a measuring section for facilitating the determination of the volume of said foodstuff contained in said containment volume, said measuring section extending substantially between said cornering sub-section and said pouring section.

3. A ladle as recited in claim 2 wherein said measuring section has at least one measuring indication marked thereon.

4. A ladle as recited in claim 3 wherein said at least one measuring indication includes at least one measuring line protruding from said wall inner surface into said containment volume.

5. A ladle as recited in claim 2 wherein said handle extends from said measuring section substantially adjacent said pouring section.

6. A ladle as recited in claim 1 further comprising a flow modifying means attachable over at least a portion of said pouring section for modifying the flow of said foodstuff as said foodstuff is poured out of said ladle.

7. A ladle as recited in claim 6 wherein said flow modifying means is releasably attachable over at least a portion of said pouring section.

8. A ladle as recited in claim 6 wherein said flow modifying means includes a flow modifying adaptor, said flow modifying adaptor being attachable to said ladle so as to contact at least a portion of said wall peripheral edge.

9. A ladle as recited in claim 8 wherein said flow modifying adaptor has at least one straining aperture extending therethrough for allowing said flow modifying means to act as a strainer.

10. A ladle as recited in claim 8 wherein said flow modifying adaptor has a flow sizing aperture extending therethrough, said flow sizing aperture being positioned, configured and sized for limiting the flow of said foodstuff out of said ladle to a predetermined flow size.

11. A ladle as recited in claim 8 wherein said wall peripheral edge defines a food contacting portion adapted to contact said foodstuff as the latter is poured out of said ladle, said pouring section defining a guiding portion for guiding said foodstuff towards said food contacting portion, said flow modifying adaptor including a flow sizing aperture extending therethrough, said flow sizing aperture being configured and sized so as to be substantially in register with said food contacting portion when said flow modifying adaptor is attached to said ladle.

12. A ladle as recited in claim 11 wherein said pouring section defines a substantially outwardly projecting pouring spout locates substantially adjacent said food contacting portion, said flow sizing aperture being configured and sized so as to be substantially in register with said pouring spout when said flow modifying adaptor is attached to said ladle.

13. A ladle as recited in claim 8 further comprising a tongue and groove combination formed between said flow modifying adaptor and said ladle peripheral wall for releasably attaching said flow modifying adaptor to said ladle.

14. A ladle as recited in claim 8 wherein said flow modifying adaptor defines a plate peripheral edge, said plate peripheral edge having a substantially arcuate plate edge first section, said plate edge first section being configured and sized for being substantially in register with said wall peripheral edge over at least a portion of said pouring section.

15. A ladle as recited in claim 14 wherein said flow modifying adaptor includes an attachment flange depending integrally from at least a portion of said plate edge first section, said attachment flange having at least one flange aperture extending therethrough, said pouring section having at least one corresponding tongue protruding substantially outwardly from said wall outer surface, said at least one flange aperture and corresponding tongue being positioned, configured and sized for cooperating in releasably attaching said flow modifying adaptor to said ladle peripheral wall.

16. A ladle as recited in claim 14 wherein said flow modifying adaptor is configured and sized for extending over substantially fully across said pouring section.

17. A ladle as recited in claim 14 wherein said plate peripheral edge also has a substantially rectilinear plate edge second section intercepting said plate edge first section.

18. A ladle as recited in claim 2 further comprising a flow modifying means attachable over at least a portion of said pouring section for modifying the flow of said foodstuff as said foodstuff is poured out of said ladle, said flow modifying means including a flow modifying adaptor, said flow modifying adaptor being attachable to said ladle so as to contact at least a portion of said wall peripheral edge, said measuring section and said flow modifying adaptor being configured and sized for allowing visualization of at least a portion of said measuring section when said flow modifying adaptor is operatively mounted on said ladle peripheral wall.

19. A ladle as recited in claim 1 wherein said pouring section defines a spout extending from said wall peripheral edge.

20. A ladle as recited in claim 19 wherein said spout is positioned substantially centrally relative to said pouring section.

21. A ladle as recited in claim 2 wherein said pouring section defines a spout extending from said wall peripheral edge substantially along a spout axis, said spout axis also substantially delimiting said measuring section from said cornering sub-section.

22. A ladle as recited in claim 1 wherein said pouring section has substantially the configuration of a quarter of a sphere and defines a pouring section radius having a radius origin, said ladle peripheral wall about said pouring section being located substantially equidistally relative to said radius origin, said pouring section radius having a radius length; said scrapping sub-section having a scrapping sub-section length, said scrapping sub-section length having a value substantially half that of said radius length.

23. A ladle as recited in claim 1 wherein said pouring section defines a spout extending from said wall peripheral edge substantially along a spout axis; said wall peripheral edge about said cornering sub-section having substantially the configuration of an end portion of an ellipse, the long axis of said ellipse being angled relative to said spout axis by an ellipse-to-spout axis angle.

24. A ladle as recited in claim 23 wherein said ellipse-to-spout axis angle has a value of approximately between 30 and 60 degrees.

25. A ladle as recited in claim 23 wherein wall peripheral edge about said scraping sub-section extends substantially collinearly from said wall peripheral edge about said cornering sub-section.

26. A ladle as recited in claim 23 wherein said ladle peripheral wall also includes a measuring section for facilitating the determination of the volume of said foodstuff contained in said containment volume, said measuring section extending substantially between said cornering sub-section and said pouring section, said wall peripheral edge about said measuring section extending substantially collinearly from said wall peripheral edge about said cornering sub-section.

27. A ladle as recited in claim 23 wherein said ladle peripheral wall also includes a measuring section for facilitating the determination of the volume of said foodstuff contained in said containment volume, measuring section extending substantially between said cornering sub-section and said pouring section, said wall peripheral edge about said measuring section extending substantially collinearly from said wall peripheral edge about said cornering sub-section; said wall peripheral edge about said scraping sub-section extending substantially collinearly from said wall peripheral edge about said cornering sub-section.

28. A ladle as recited in claim 1 wherein said wall peripheral edge about said cornering sub-section includes a pair of cornering segments, said cornering segments converging towards a cornering apex.

29. A ladle as recited in claim 28 wherein said ladle peripheral wall substantially adjacent to said cornering apex defines a lip protruding substantially outwardly from the remainder of said wall peripheral edge.

30. A ladle as recited in claim 28 wherein each of said cornering segment extends substantially along a corresponding segment axis, said segment axes being angled relative to each other by a segment axis angle.

31. A ladle as recited in claim 30 wherein said segment axis angle is a substantially acute angle.

32. A ladle as recited in claim 30 wherein said segment axis angle has a value of approximately between 30 and 45 degrees.

33. A ladle as recited in claim 28 wherein said cornering apex has a substantially pointed configuration.

34. A ladle as recited in claim 28 wherein said cornering apex has a substantially rounded configuration.

35. A ladle as recited in claim 1 wherein said pouring section and said scrapping sub-section extend in a common reference geometrical plane, said cornering sub-section having a lip portion thereof protruding from said reference geometrical plane, said lip portion protruding from said reference geometrical plane so as to form a lip-to-plane angle therebetween.

36. A ladle as recited in claim 35 wherein said lip-to-plane angle has a value of approximately between 1 and 90 degrees.

37. A ladle for allowing both the collection of a foodstuff from a container into said ladle and the pouring out of said foodstuff from said ladle, said container defining a container base wall and a container peripheral wall, said container base and peripheral walls merging into a container corner section, said ladle comprising:

a substantially concave ladle peripheral wall, said ladle peripheral wall having a wall peripheral edge delimiting a containment volume, said ladle peripheral wall defining a wall inner surface and a wall outer surface, said ladle peripheral wall including a pouring section for facilitating the pouring out of said foodstuff from said containment volume, said pouring section having substantially the configuration of a quarter portion of a sphere;

a collecting section for facilitating the collection of said foodstuff from said container into said containment volume, said collecting section defining a cornering sub-section wherein said wall peripheral edge has a substantially convex configuration so as to define a lip protruding substantially outwardly from the remainder of said ladle peripheral wall;

a handle extending from said ladle peripheral wall substantially intermediate said pouring section and said cornering sub-section;

whereby said cornering sub-section is usable for both scooping the foodstuff located substantially adjacent said container corner section into said containment volume and scrapping said foodstuff from at least a portion of said container corner section.

38. A ladle as recited in claim 37 wherein said ladle peripheral wall also includes a measuring section for facilitating the determination of the volume of said foodstuff contained in said containment volume, said measuring section extending substantially between said cornering sub-section and said pouring section.

39. A ladle as recited in claim 37 wherein said wall peripheral edge about said cornering sub-section includes a pair of cornering segments, said cornering segments converging towards a cornering apex.

40. A ladle as recited in claim 39 wherein said cornering apex defines a lip protruding substantially outwardly from the remainder of said wall peripheral edge.

41. A ladle as recited in claim 39 wherein each of said cornering segment extends substantially along a corresponding segment axis, said segment axes being angled relative to each other by a segment axis angle.

42. A ladle as recited in claim 41 wherein said segment axis angle is a substantially acute angle.

43. A ladle as recited in claim 41 wherein said segment axis angle has a value of approximately between 30 and 45 degrees.

44. A ladle as recited in claim 39 wherein said cornering apex has a substantially pointed configuration.

45. A ladle as recited in claim 39 wherein said cornering apex has a substantially rounded configuration.

46. A ladle as recited in claim 37 wherein said pouring section extends in a reference geometrical plane, said cornering sub-section having a lip portion thereof protruding from said reference geometrical plane, said lip portion protruding from said reference geometrical plane so as to form a lip-to-plane angle therebetween.

47. A ladle as recited in claim 46 wherein said lip-to-plane angle has a value of approximately between 1 and 90 degrees.

48. A ladle for allowing both the collection of a foodstuff from a container into said ladle and the pouring out of said foodstuff from said ladle, said container defining a container base wall and a container peripheral wall, said container base and peripheral walls merging into a container corner section, said ladle comprising:

a substantially concave ladle peripheral wall, said ladle peripheral wall having a wall peripheral edge delimiting a containment volume, said ladle peripheral wall defining a wall inner surface and a wall outer surface, said ladle peripheral wall including a pouring section for facilitating the pouring out of said foodstuff from said containment volume, said pouring section having substantially the configuration of a quarter portion of a sphere;

a collecting section extending from said pouring section for facilitating the collection of said foodstuff from said container into said containment volume;

said pouring and collecting sections being delimited by a pouring-to-collecting delimiting plane extending therebetween;

a handle extending from said ladle peripheral wall so as to be offset relative to said pouring-to-collecting delimiting plane on the same side of the latter as said collecting section;

whereby the off-setting of said handle is adapted to facilitate the pouring of said foodstuff from said pouring section.

49. A ladle as recited in claim 48 wherein said handle is located substantially adjacent to said pouring-to-collecting delimiting plane.

50. A ladle as recited in claim 49 wherein said handle is located substantially opposite to said collecting section.

51. A ladle as recited in claim 48 wherein said ladle peripheral wall also includes a measuring section for facilitating the determination of the volume of said foodstuff contained in said containment volume, said pouring-to-collecting delimiting plane also delimiting said pouring section from said measuring section, said measuring section extending substantially between said collecting and pouring sections, said handle extending from said measuring section.

52. A ladle as recited in claim 51 wherein said handle is located substantially adjacent to said pouring-to-collecting delimiting plane.

53. A ladle as recited in claim 51 wherein said handle is located substantially opposite to said collecting section.

54. A ladle as recited in claim 48 wherein said handle defines a handle longitudinal axis and said handle is twisted substantially helicoidally and at least partially along said handle longitudinal axis.

55. A ladle as recited in claim 48 wherein said handle defines a pair of substantially opposed handle surfaces, said handle surfaces being twisted substantially helicoidally and at least partially along said handle longitudinal axis.

56. A ladle as recited in claim 55 wherein said handle has a substantially ovaloid configuration, said ovaloid configuration tapering towards a substantially flat configuration in a direction leading towards said ladle peripheral wall.

57. A ladle as recited in claim 56 wherein said handle extends integrally from said wall peripheral edge.

* * * * *